US008917307B2

(12) United States Patent
Rosenberg

(10) Patent No.: US 8,917,307 B2
(45) Date of Patent: Dec. 23, 2014

(54) VIDEO CALLING

(75) Inventor: Jonathan Rosenberg, Freehold, NJ (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 13/404,511

(22) Filed: Feb. 24, 2012

(65) Prior Publication Data
US 2013/0222419 A1   Aug. 29, 2013

(51) Int. Cl.
H04N 7/14    (2006.01)
H04L 29/06   (2006.01)

(52) U.S. Cl.
CPC ............ *H01N 7/147* (2013.01); *H04L 65/1096* (2013.01)
USPC ..................................... 348/14.01

(58) Field of Classification Search
CPC ............................ H04L 65/1096; H04N 7/147
USPC .............. 348/14.01–14.15; 379/93.17, 93.25, 379/93.21
See application file for complete search history.

(56) References Cited

U.S. PATENT DOCUMENTS

| 5,751,722 | A  | * | 5/1998  | Maekawa ...................... 370/522 |
| 5,835,130 | A  | * | 11/1998 | Read et al. .................. 348/14.11 |
| 6,400,804 | B1 | * | 6/2002  | Bilder ............................ 379/76 |
| 6,757,260 | B2 | * | 6/2004  | Pandit ........................... 370/260 |
| 2001/0033324 | A1 | * | 10/2001 | Sukeno et al. ............. 348/14.01 |
| 2008/0002022 | A1 | * | 1/2008  | VanEpps ......................... 348/22 |
| 2008/0117283 | A1 |   | 5/2008  | Yang et al. |
| 2008/0136895 | A1 | * | 6/2008  | Mareachen ................ 348/14.03 |
| 2013/0141516 | A1 | * | 6/2013  | Baldwin .................... 348/14.03 |

FOREIGN PATENT DOCUMENTS

| KR | 10-2006-0036643 A | 5/2006 |
| KR | 10-2009-0006279 A | 1/2009 |
| KR | 10-2010-0048293 A | 5/2010 |
| KR | 10-2011-0101040 A | 9/2011 |

OTHER PUBLICATIONS

"International Search Report", Mailed Date: Jun. 27, 2013, Application No. PCT/US2013/027537, Filed date: Feb. 24, 2013, pp. 10.

* cited by examiner

*Primary Examiner* — Stella Woo
(74) *Attorney, Agent, or Firm* — Sonia Cooper; Jim Ross; Micky Minhas

(57) ABSTRACT

In a method and system for performing a video call between a first terminal and a second terminal, video data for the video call is captured with a camera of the first terminal. The captured video data is transmitted in real-time to the second terminal for use in the video call. The captured video data is output in real-time at a display of the second terminal in the video call. A video hold input is received from a user at the first terminal to initiate a video hold state. Holding video data is determined for output at the display of the second terminal in the video hold state. In the video hold state, the determined holding video data is output at the display of the second terminal, instead of outputting video data captured by said camera of the first terminal in real-time at the display of the second terminal.

39 Claims, 3 Drawing Sheets

VIDEO CALLING

TECHNICAL FIELD

The present invention relates to video calling. In particular, the present invention relates to performing a video call between a first terminal and a second terminal.

BACKGROUND

Communication systems allow the user of a terminal or device, such as a personal computer or mobile phone, to communicate with other users across a computer network such as the Internet. Communication systems, such as packet-based communication systems (including video over Internet protocol (IP) communication systems), allow users to exchange live video streams over the Internet, thereby facilitating video calls to be made over the communication system. Packet-based communication systems may be beneficial to the user as they are often of significantly lower cost than communication systems using fixed line or mobile networks. This may particularly be the case for long-distance communication. To use a video-over-IP system for video calling, the user installs and executes client software on their terminal. The client software provides the video IP connections as well as other functions such as registration and authentication. In addition to video communication, the client may also provide further features such as audio, instant messaging ("IM"), SMS messaging, and voicemail.

To engage in a video call a user has a camera, such as a webcam, which is used to capture video data of the user. The captured video data is transmitted to the far end terminal of the video call over the communication system, where it can be output in real-time to thereby display the video data to a user of the far end terminal in the video call. Similarly, video data of the user of the far end terminal may be captured and transmitted to the near end device over the communication system for output to the user of the near end terminal in real-time in the video call. As well as transmitting the video data between the users in the video call, audio data may be received (e.g. using microphones) and transmitted between the users of the video call, thereby allowing the users to communicate with each other both visually and aurally in the video call. The output of video data in a video call can enhance a user's experience of the call as it allows the user to perceive visual data, in combination with audio data received from the other user in the call.

SUMMARY

The inventor has realized that while a user's experience of a video call may be enhanced by receiving video data from the other user in the video call, the user may be less comfortable with transmitting video data of himself to the other user in the video call. For example, the user may find it intrusive and/or restrictive to have video data of himself transmitted to the other user in a video call, and this may prevent the user from performing actions that he desires to perform while he engages in the video call. Furthermore, the user may not want the other user to know that they are performing particular actions during a video call, for example, the user may need to sneeze but does not want to do so on camera in the video call. However, the user may not want to deprive the other user in the video call from receiving video data during the video call.

According to a first aspect of the invention there is provided a method of performing a video call between a first terminal and a second terminal, the method comprising: capturing video data, for the video call, with a camera of the first terminal; transmitting the captured video data in real-time to the second terminal for use in the video call; outputting the captured video data in real-time at a display of the second terminal in the video call; receiving a video hold input from a user at the first terminal to initiate a video hold state; determining holding video data for output at the display of the second terminal in the video hold state; and in the video hold state, outputting, at the display of the second terminal, said determined holding video data instead of outputting video data captured by said camera of the first terminal in real-time.

In accordance with preferred embodiments, the user can initiate a video hold state by actuating the video hold input (e.g. by pressing a button on the first terminal, by clicking on an icon displayed on a display of the first terminal or by pressing a particular video hold region on a touch sensitive screen of the first terminal) and in the video hold state video data of the user is not captured and output at the second terminal in real-time in the video call. Instead the holding video data is output at the second terminal in the video call. Advantageously, the holding video data may provide continuity in the video data output at the second terminal in the video call such that a user of the second terminal does not think that the video call has dropped even though video data of the user of the first terminal is not output in real-time at the second terminal in the video call when the video hold state has been activated. This can provide a good user experience of the call (by allowing video data to be included in the video call) while still allowing the user to initiate a video hold state in which video data of the user is not output at the second terminal in the video call in real-time. This may provide the user with more freedom to perform other actions while engaging in the video call.

The determination of the holding video data may be performed responsive to receiving said video hold input at the first terminal.

The method may further comprise transmitting a video hold message to the second terminal responsive to receiving said video hold input at the first terminal, said video hold message indicating that the video hold state has been initiated, wherein said determining holding video data may be performed at the second terminal responsive to receiving said video hold message at the second terminal.

The determination of the holding video data may be performed at the first terminal and the method may further comprise transmitting the determined holding video data to the second terminal.

The method may further comprise, in the video hold state, stopping the transmission of the captured video data in real-time to the second terminal. The method may further comprise, in the video hold state, stopping the capturing of video data with the camera of the first terminal.

The holding video data may be based on video data captured with the camera of the first terminal prior to the initiation of the video hold state. The holding video data may be a single image.

The holding video data may comprise a single image which is overlaid with moving images which are output at the display of the second terminal in the video hold state. A portion of the single image may include an image of the user and the method may further comprise determining said moving images based on feature recognition applied to said image of the user. The moving images may represent movements to the head or eyes of the user in said image of the user.

The single image may be a frame of the video data captured by the camera of the first terminal. The single image may be representative of at least part of an image captured by the camera when the video hold state is initiated.

The holding video data may comprise a plurality of frames of the video data captured by the camera of the first terminal, and the plurality of frames may be output at the display of the second terminal in the video hold state. The plurality of frames may be the last frames of video data captured by the camera before the video hold state is initiated.

The method may further comprise, in the video hold state, outputting an indication that the video has been placed on hold at the display of the second terminal.

The method may further comprise receiving a video unhold input from the user at the first terminal to end the video hold state and thereby resume outputting the captured video data in real-time at the display of the second terminal in the video call.

According to a second aspect of the invention there is provided a system comprising a first terminal and a second terminal, wherein the system is configured to perform a video call between the first and second terminals, wherein the first terminal comprises: a camera configured to capture video data for the video call; a transmitting module configured to transmit the captured video data in real-time to the second terminal for use in the video call; and a user interface configured to receive a video hold input from a user to initiate a video hold state, and wherein the second terminal comprises: a display configured to output the captured video data in real-time in the video call, wherein the second terminal is configured to output, in the video hold state, holding video data at the display instead of outputting video data captured by said camera of the first terminal in real-time.

According to a third aspect of the invention there is provided a method of engaging in a video call between a first terminal and a second terminal, the method comprising: capturing video data, for the video call, with a camera of the first terminal; transmitting the captured video data to the second terminal for output in real-time at a display of the second terminal in the video call; receiving a video hold input from a user at the first terminal to initiate a video hold state; and transmitting data to the second terminal responsive to receiving said video hold input at the first terminal, said transmitted data being such that, in the video hold state, holding video data, instead of video data captured by said camera of the first terminal in real-time, is output at the display of the second terminal.

According to a fourth aspect of the invention there is provided a terminal configured to engage in a video call with a further terminal, the terminal comprising: a camera configured to capture video data for the video call; a transmitting module configured to transmit the captured video data to the further terminal for output in real-time at a display of the further terminal in the video call; and a user interface configured to receive a video hold input from a user to initiate a video hold state, wherein the transmitting module is further configured to transmit data to the further terminal responsive to receiving said video hold input at the user interface, said transmitted data being such that, in the video hold state, holding video data, instead of video data captured by said camera of the terminal in real-time, is output at the display of the further terminal.

According to a fifth aspect of the invention there is provided a computer program product for engaging in a video call between a first terminal and a second terminal, the computer program product being embodied on a non-transient computer-readable medium and configured so as when executed on a processor of the first terminal to perform the steps of: capturing video data for the video call; transmitting the captured video data to the second terminal for output in real-time at a display of the second terminal in the video call; receiving a video hold input from a user at the first terminal to initiate a video hold state; and transmitting data to the second terminal responsive to receiving said video hold input, said transmitted data being such that, in the video hold state, holding video data, instead of video data captured by said camera of the first terminal in real-time, is output at the display of the second terminal.

According to a sixth aspect of the invention there is provided a method of engaging in a video call between a first terminal and a second terminal, the method comprising: receiving, at the second terminal, video data captured at the first terminal in real-time for use in the video call; outputting the captured video data in real-time at a display of the second terminal in the video call; receiving, at the second terminal, a video hold message indicating that a video hold state has been initiated; determining holding video data for output at the display of the second terminal in the video hold state; and in the video hold state, outputting, at the display of the second terminal, said determined holding video data instead of outputting video data captured at the first terminal in real-time.

According to a seventh aspect of the invention there is provided a terminal configured to engage in a video call with another terminal, the terminal comprising: a receiving module configured to receive video data captured at said another terminal in real-time for use in the video call, and further configured to receive a video hold message indicating that a video hold state has been initiated; a display configured to output the captured video data in real-time in the video call; and a determining module configured to determine holding video data for output at the display in the video hold state, wherein the second terminal is configured to output, in the video hold state, at the display of the second terminal, said determined holding video data instead of outputting video data captured at the first terminal in real-time.

According to an eighth aspect of the invention there is provided a computer program product for engaging in a video call between a first terminal and a second terminal, the computer program product being embodied on a non-transient computer-readable medium and configured so as when executed on a processor of the second terminal to perform the steps of: receiving video data captured at the first terminal in real-time for use in the video call; outputting the captured video data in real-time at a display of the second terminal in the video call; receiving a video hold message indicating that a video hold state has been initiated; determining holding video data for output at the display of the second terminal in the video hold state; and in the video hold state, outputting, at the display of the second terminal, said determined holding video data instead of outputting video data captured at the first terminal in real-time.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only.

Figure 1:
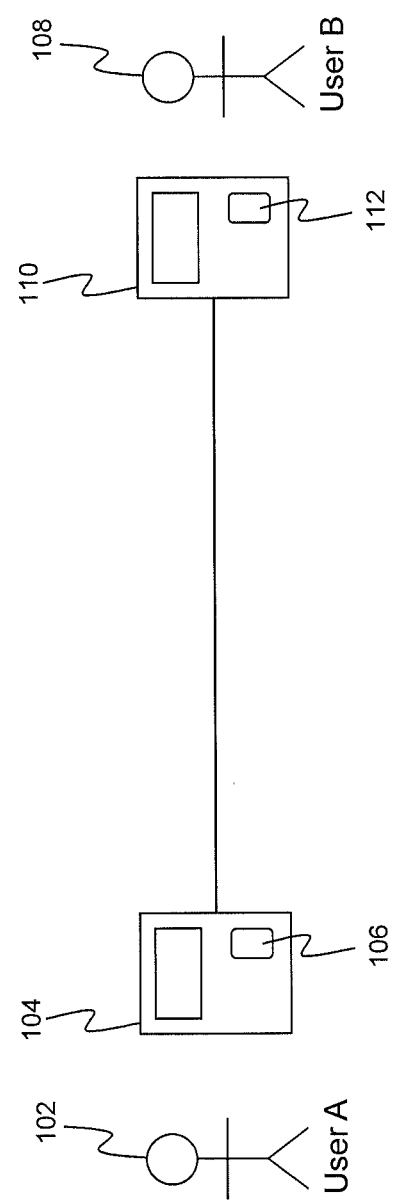
FIG. 1 shows a communication system according to a preferred embodiment.

FIG. 1 shows a communication system comprising a first user ("User A") 102 who has an associated first user terminal 104 and a second user ("User B") 108 who has an associated second user terminal 110. In other embodiments the communication system may comprise any number of users and associated user terminals. The user terminals 104 and 110 can communicate with each other, for example over a network (which may, for example, be the Internet or a telephone network such as the PSTN or a mobile telephone network) in the communication system, thereby allowing the users 102 and 108 to communicate with each other. In the preferred embodiment the communication system is a packet-based communication system (e.g. a peer-to-peer (P2P) communication system), but other types of communication system could also be used, such as non-P2P or VoIP systems. The user terminal 104 may be, for example, a mobile phone, a television, a personal digital assistant ("PDA"), a personal computer ("PC") (including, for example, Windows™, Mac OS™ and Linux™ PCs), a gaming device, a tablet or other embedded device able to connect to the network for communication over the communication system. The user terminal 104 is arranged to receive information from and output information to the user 102 of the user terminal 104. In a preferred embodiment of the invention the user terminal 104 comprises a display such as a screen, a camera for capturing (i.e. receiving) visual data, and an input device such as a keyboard, mouse, touch-screen, keypad and/or joystick.

The user terminal 104 executes a communication client 106, provided by a software provider associated with the communication system. The communication client 106 is a software program executed on a local processor in the user terminal 104. The client 106 performs the processing required at the user terminal 104 in order for the user terminal 104 to transmit and receive data over the communication system. As is known in the art, the client 106 may be authenticated to communicate over the communication system through the presentation of digital certificates (e.g. to prove that User A 102 is a genuine subscriber of the communication system—described in more detail in WO 2005/009019).

The user terminal 110 corresponds to the user terminal 104. The user terminal 110 executes, on a local processor, a communication client 112 which corresponds to the communication client 106. The client 112 performs the processing required to allow the user 108 to communicate over the network in the same way that the client 106 performs the processing required to allow the user 102 to communicate over the network. The user terminals 104 and 110 are end points in the communication system. FIG. 1 shows only two users (102 and 108) for clarity, but many more users may be connected to the communication system, and may communicate over the communication system using respective communication clients executed on respective end points of the communication system, as is known in the art.

Figure 2:
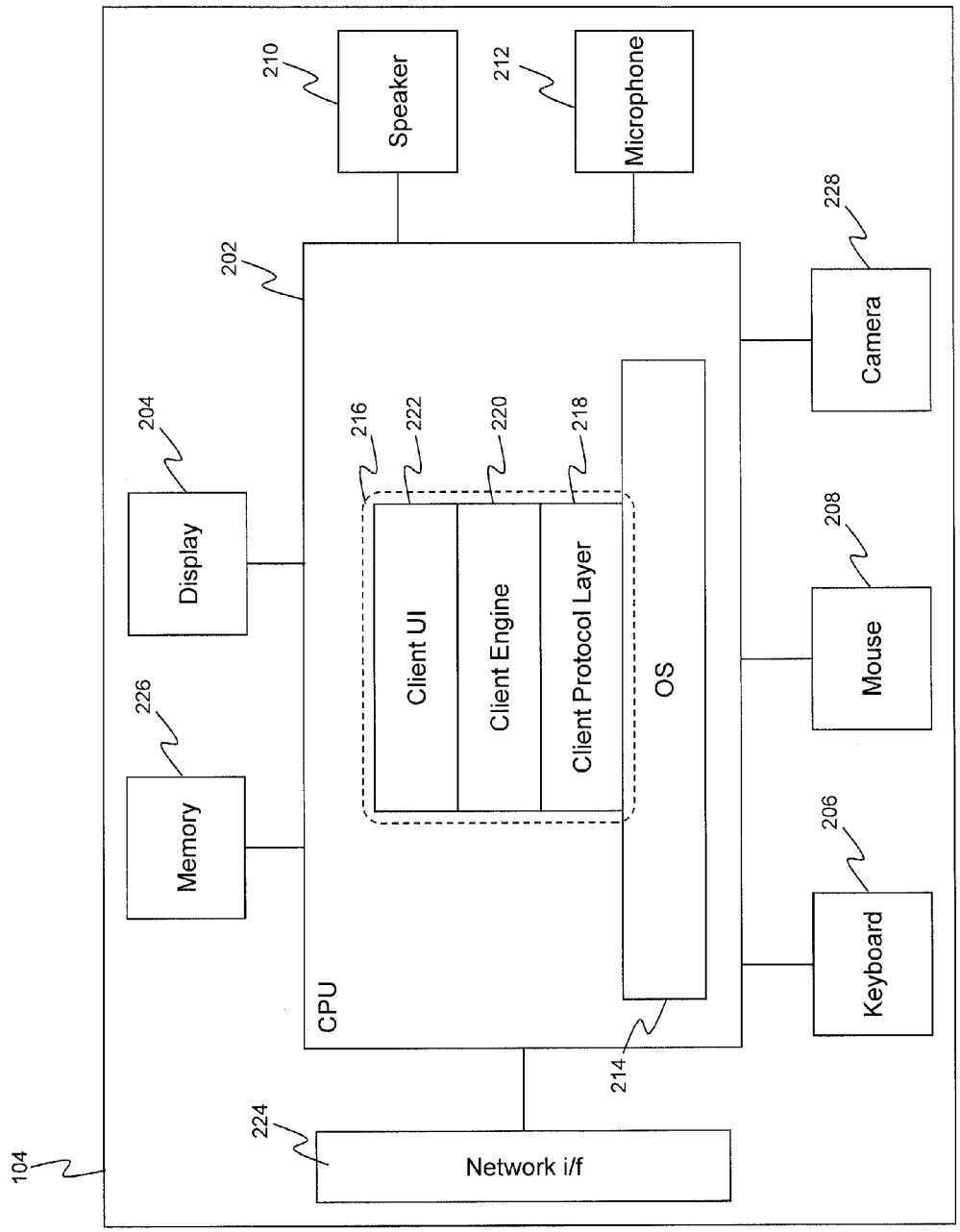
FIG. 2 shows a schematic view of a terminal according to a preferred embodiment.

FIG. 2 illustrates a detailed view of the user terminal 104 on which is executed client 106. The user terminal 104 comprises a central processing unit ("CPU") 202, to which is connected a display 204 such as a screen, input devices such as a keyboard (or a keypad) 206 and a pointing device such as a mouse 208. The display 204 may comprise a touch screen for inputting data to the CPU 202. An output audio device 210 (e.g. a speaker) and an input audio device 212 (e.g. a microphone) are connected to the CPU 202. The user terminal 104 also comprises a camera 228 for receiving visual data from the surroundings of the user terminal 104. For example the camera 228 may receive visual data of the user 102. The camera 228 is connected to the CPU 202. The display 204, keyboard 206, mouse 208, output audio device 210, input audio device 212 and camera 228 are integrated into the user terminal 104. In alternative user terminals one or more of the display 204, the keyboard 206, the mouse 208, the output audio device 210, the input audio device 212 and the camera 228 may not be integrated into the user terminal 104 and may be connected to the CPU 202 via respective interfaces. One example of such an interface is a USB interface. The CPU 202 is connected to a network interface 224 such as a modem for communication with the network (e.g. the Internet) of the communication system. The network interface 224 may be integrated into the user terminal 104 as shown in FIG. 2. In alternative user terminals the network interface 224 is not integrated into the user terminal 104. The user terminal 104 also comprises a memory 226 for storing data as is known in the art.

FIG. 2 also illustrates an operating system ("OS") 214 executed on the CPU 202. Running on top of the OS 214 is a software stack 216 for the client 106. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 102 via the user interface of the client and to receive information from the user 102 via the user interface.

The user terminal 110 is implemented in the same way as user terminal 104 as described above, wherein the user terminal 110 may have corresponding elements to those described herein in relation to user terminal 104.

Figure 3:
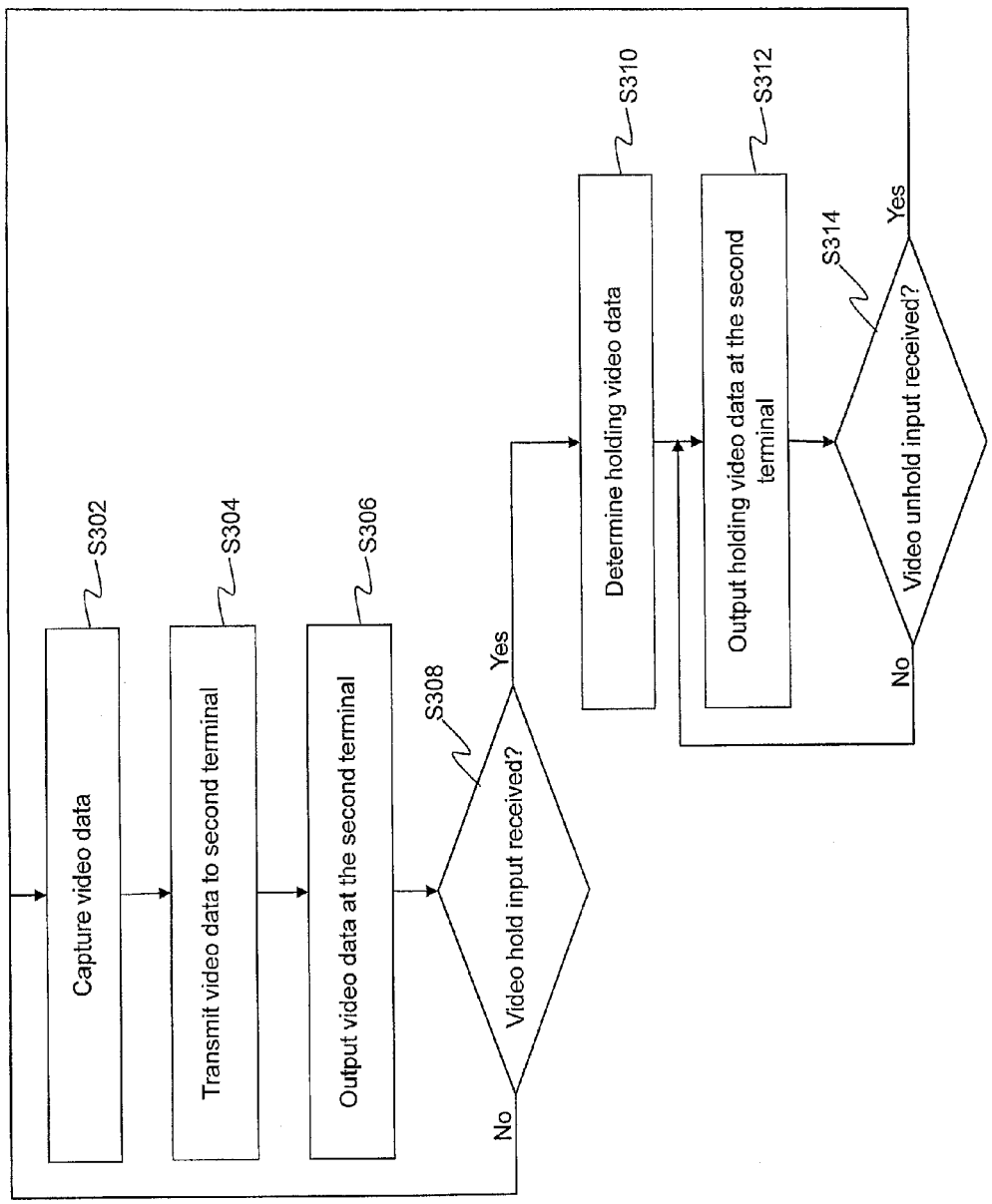
FIG. 3 is a flow chart for a process of performing a video call between a first terminal and a second terminal according to a preferred embodiment.

With reference to FIG. 3 there is now described a method of performing a video call between the users 102 and 108. A video call is initiated between the terminals 104 and 110 as is known in the art. The user 102 may initiate the video call by using the terminal 104 to call the terminal 110 over the communication system, and the user 108 can then accept the call to thereby set up the video call between the terminals 104 and 110 as is known in the art. Alternatively, the user 108 may initiate the video call by using the terminal 110 to call the terminal 104 over the communication system, and the user 102 can then accept the call to thereby set up the video call between the terminals 104 and 110 as is known in the art.

The video call is initiated and in step S302 video data is captured for the video call using the camera 228 of the terminal 104. As is known in the art, video data comprises a sequence of frames. The user 102 can position and/or direct the camera 228, or the user can adjust operating controls of the camera such as resolution, contrast, brightness and/or frame rate, in order to control the images which are captured by the camera 228. For example, the user 102 may control the camera 228 such that the camera captures images of the user 102 for use as the video data which is to be transmitted to the terminal 110 in the video call with the user 108.

In step S304 the video data which is captured in step S302 is transmitted from the terminal 104 to the terminal 110 over the communication system. The transmission of video data in step S304 is performed in accordance with known techniques in the art. For example, the video data may be transmitted using a video-over-IP protocol and may be transmitted over the Internet from the terminal 104 to the terminal 110. For example, the video data may be packetized and sent as discrete packets of data from the terminal 104 to the terminal 110. Furthermore, for example, the video data may be encoded using any video encoding technique before being transmitted from the terminal 104 to the terminal 110, wherein the encoded video data is decoded at the terminal 110 in order to be output at the display of the terminal 110.

In step S306 the video data received from the terminal 104 is output on the display of the terminal 110, thereby allowing the user 108 to view the video data. The video data is output at the terminal 110 in real-time during the video call. For example, the total time delay between capturing the video data at the terminal 104 in step S302 and outputting the video data at the terminal 110 in step S306 should be short enough for the communication to flow smoothly in the video call between the users 102 and 108 (i.e. the video data must be transmitted and outputted in real-time). For example, the time delay should not be more than a second.

Steps S302 to S306 allow video data to be captured at the terminal 104, transmitted to the terminal 110 and outputted at the terminal 110 in the video call. In a similar manner, video data may be captured at the terminal 110, transmitted to the terminal 104 and outputted at the terminal 104 in the video call to thereby allow video data of the user 108 to be displayed to the user 102 in the video call. Steps S302 to S306 are performed continuously when the video call is operating in a normal state (as opposed to when the video call is operating in a video hold state, described in more detail below).

In step S308 the client 106 running on the terminal 104 can determine whether a video hold input has been received from the user 102. The video hold input allows the user 102 to indicate that he would like to initiate a video hold state. If the user 102 has not provided a video hold input at the terminal 104 then the method continues to perform steps S302 to S306 such that the video call continues in a normal state with video data being captured at the terminal 104 and transmitted to the terminal 110 to be output to the user 108.

The user 102 may then decide that he would like to initiate the video hold state. In the video hold state live video data is not captured by the camera 228, transmitted to the terminal 110 and output to the user 108 at the terminal 110 in real-time in the video call. The user 102 can provide a video hold input to the client 106 (e.g. using the user interface 222) to indicate that the user 102 would like to initiate the video hold state. This may be done, for example, by the user pressing a button on the terminal 104, clicking on an icon displayed on the display 204 or by touching a particular region of a touch screen of the terminal 104, or by issuing a voice command which is received at a voice recognition module via the microphone 212. The user 102 may interact with the terminal 104 in any other suitable way to provide the video hold input. When the user 102 has provided the video hold input, the client 106 at the terminal 104 will determine in step S308 that the video hold input has been received and then the method will pass to step S310.

In step S310 holding video data is determined responsive to the video hold input being received at the terminal 104. Step S310 may be performed at the terminal 104 (e.g. by the client 106) and then the determined holding video data may be transmitted to the terminal 110 to be output on the display of the terminal 110.

Alternatively, step S310, of determining the holding video data, may be performed at the terminal 110. In this case a video hold message is transmitted from the terminal 104 to the terminal 110 in response to the user 104 providing the video hold input, wherein the video hold message indicates that the video hold state has been initiated. In response to receiving the video hold message at the terminal 110, the client 112 at the terminal 110 determines the holding video data which is to be output on the display of the terminal 110 in the video hold state.

In step S312 the determined holding video data is output at the display of the terminal 110 instead of outputting video data captured by the camera 228 of the terminal 104 in real-time. In this way, in the video hold state, the holding video data is output on the display of the terminal 110 in the video call. This means that, while in the video hold state, the user 102 can perform some actions without those actions being captured by the camera 228, transmitted to the terminal 110 and output to the user 108 in the video call.

The holding video data continues to be output at the display of the terminal 110 in the video hold state. In step S314 it is determined (e.g. by the client 106 of the terminal 104) whether a video unhold input has been received from the user 102. The video unhold input allows the user 102 to indicate that he would like to end the video hold state, and thereby return to the normal state of the video call. If the user 102 has not provided a video unhold input at the terminal 104 then the method continues to perform step S312 such that the holding video data continues to be output at the terminal 110 to the user 108 in the video call.

The user 102 may then decide that he would like to terminate the video hold state. The user 102 can provide a video unhold input to the client 106 (e.g. using the user interface 222) to indicate that the user 102 would like to end the video hold state. This may be done, for example, by the user pressing a button on the terminal 104, clicking on an icon displayed on the display 204 or by touching a particular region of a touch screen of the terminal 104, or by issuing a voice command which is received at a voice recognition module via the microphone 212. The user 102 may interact with the terminal 104 in any other suitable way to provide the video unhold input. When the user 102 has provided the video unhold input, the client 106 at the terminal 104 will determine in step S314 that the video unhold input has been received and then the method will pass back to step S302 so that the video call can continue in the normal state described above. When the video hold state ends, a video unhold message may be sent from the terminal 104 to the terminal 110 to indicate to the terminal 110 that the video hold state has ended so that the terminal 110 knows that the video call is to continue in the normal state rather than in the video hold state.

When the video call is operating in the video hold state the camera 228 may, or may not, continue to capture video data at the terminal 104. However, it may be advantageous for the camera 228 to stop capturing video data in the video hold state because the video data will not be used in the video call, and so stopping the capturing of the video data will reduce the processing resources used at the terminal 104 without detrimentally affecting the video call. Similarly, when the video call is operating in the video hold state video data may, or may not, continue to be transmitted from the terminal 104 to the terminal 110. However, it may be advantageous to stop transmitting video data from the terminal 104 to the terminal 110 in the video hold state to thereby reduce the processing resources used at the terminal 104 and to thereby reduce the amount of data that is transmitted over the network in the communication system. However, in some embodiments it may be advantageous to continue to capture video data at the terminal 104 and to transmit the captured video data to the terminal 110 in the video hold state, e.g. to avoid the need to adjust the operation of the camera 228 and the processing of the captured video data at the terminal 104. In all of the embodiments, in the video hold state (initiated by the user 102), video data is not captured at the camera 228 and output at the terminal 110 in real-time in the video call.

It may be advantageous for video data to be transmitted from the terminal 104 to the terminal 110 in the video hold state, but wherein this transmitted video data is not captured by the camera 228 but is instead generated by algorithms executed at the terminal 104 which try to simulate the image of the user 102 sitting in front of the camera 228. For example, a recognition of the head of the user 102 in images captured by the camera 228 at the user terminal 104 prior to the initiation of the video hold state may be performed. When the user 102 presses hold (thereby initiating the video hold state), the client executed on the user terminal 104 generates holding video data which is based on the image of the user's head but may include some overlaid moving images. For example, the generated holding video data may have the user's head nodding slightly (since a perfectly still image is perceived as clearly artificial by the user 108). Similarly the client executed on the user terminal 104 may detect eyes of the user 102 in the images and insert blinking into the holding video data. Moving images such as these which can be overlaid over an image of the user 102 make the video hold state less detectable for the user 108 viewing the holding video data at the user terminal 110. It may be desirable for the user 108 at the terminal 110 not to be able to tell the difference between normal video of the video call and the holding video data which is output at the terminal 110 during the video hold state. The client executed at the terminal 110 in this example would receive the holding video data and process it in the same way as normal video data is processed during the video call. Indeed, the client executed at the terminal 110 may not be able to tell that the video call has been held, as the decoder at the terminal 110 continues to operate as normal to decode the video data received from the user terminal 104 in the video call.

When the user 102 initiates the video hold state, e.g. by clicking "video hold" in the user interface 222 of the client 106, the user 108 still sees an image (or images) displayed on the display of the terminal 110. The image(s) is(are) the holding video data which is displayed at the terminal 110 as if it was video data captured by the camera 228 at the terminal 104 in real-time in the video call. In preferred embodiments, the holding video data is based on video data captured by the camera 228 prior to the initiation of the video hold state. The holding video data is used to make it seem like the user 102 is still there, sending video data captured in real-time to the terminal 110 in the video call, even though he is not.

The holding video data may be a still image. A portion of the still image may include an image of the user 102, so that the user 108 can see an image of the user 102 in the video call in the video hold state. The still image may be a frame of video data captured by the camera 228 prior to the initiation of the video hold state. For example, the still image may be the last frame of video data captured by the camera 228 (or a recently captured frame) before the video hold state is initiated by the user 102. In this way the still image can be representative of at least part of an image captured by the camera (e.g. the current background of the user) when the video hold state is initiated. In this sense the holding video data may be considered to be a frozen image of the video data transmitted to the terminal 110 immediately prior to the initiation of the video hold state by the user 102. In this way when the user 102 actuates the "video hold" action at the terminal 104 the video displayed on the display of the terminal 110 freezes. Alternatively, the user 102 may be able to select an image (e.g. from recently captured video frames captured by the camera 228) to be used as the holding video data. When the user 102 actuates a "video unhold" action the video displayed on the display of the terminal 110 resumes.

The holding video data may comprise a still image as described above but which is overlaid with moving images which are output (e.g. on a loop or randomly or with some pseudo-random timing) at the display of the terminal 110 in the video hold state. When the still image includes an image of the user 102 then the moving images which are overlaid onto the still image may be based on feature recognition applied to the video data of the user 102 captured by the camera 228 prior to the initiation of the video hold state. For example, the eyes of the user 102 could be identified and overlaid at the correct location in the still image using feature recognition. For example, the holding video data may comprise the last frame captured by the camera 228 (or another recently captured frame) prior to the initiation of the video hold state, or a frame selected by the user 102, but now interpolated with movements, such as nods of the head or blinks of the eyes of the user 102 in the image. The moving images may represent any movement of the user 102, such as a nod of the head or a blink of the eyes as described above which make it seem like the user 102 is still there, sending video data, even though he is not. The overlaid moving images (e.g. head nods and blinks) preferably occur at somewhat randomly spaced intervals to appear natural, rather than simply being looped since looped video is easily detected by humans as being artificial. Further changes to the holding video data may be implemented to make the holding video data seem more perceptually similar (to the user 108) to real video data of the video call which is captured and transmitted in real-time from the terminal 104 when the video call is not in the video hold state. For example, changes in the lighting of the holding video data may be implemented (which may change the background of the images of the holding video data) and/or errors may be inserted into the holding video data to simulate network problems which may be experienced by the video call. For example, when the video hold data is generated at the receiver, the receiving client could use end-to-end (e2e) measurements on packet loss to inject artificial packet loss into the video hold data stream, as if it had been transmitted over the network and seen that amount of packet loss. However, when the video hold data is sent from the caller to the callee, it will automatically look natural in terms of packet loss, because packet loss gets applied to the video hold data just as it would with video capture of the actual user. In this way the transition between a non-video hold state and the video hold state of the video call may be less noticeable to the user 110.

The holding video data may comprise a plurality of video frames captured by the camera 228 prior to the initiation of the video hold state wherein the plurality of video frames are output (e.g. on a loop) at the display of the terminal 110 in the video hold state. For example, the holding video data may be a copy of the last frames of video data captured by the camera 228 (or other recently captured frames) before the video hold state was initiated. Alternatively, the plurality of frames may be selected by the user 102 (e.g. from recently captured video frames captured by the camera 228). The duration of the holding video data may, for example, be 2 seconds or 10 seconds, or any other suitable length of time over which the video data can be output in the video call in the video hold state.

In preferred embodiments, an aim is that the user 108 does not know that the user 102 has initiated the video hold state in the video call. However, in some situations, it may be beneficial to inform the user 108 that the video call has been placed on hold, for example, in order to ensure that the user 108 does not perceive a problem with the video output at the terminal 110. For example, an indication that video has been placed on hold may be displayed on the display at the terminal 110 together with the holding video data when the video call is operating in the video hold state. The indication could be a text indication with a message to the user 108, saying "the video is on hold", or such like. The indication could be a symbol which is displayed on the display at the terminal 110 or a sound which is output from the speakers at the terminal 110 which the user 108 recognizes as indicating that the video call is operating in the video hold state. The indication could be output at the terminal 110 to the user 108 in any other suitable manner.

If the user 102 were to switch off, or disconnect, the camera 228 during the video call with the user 108 then no video data would be output at the display of the terminal 110 to the user 108 in the video call. In this case, the user 108 may perceive this as a problem with the video call, such as a dropped call. However, with the methods described herein, in which the user 102 can initiate the video hold state in which holding video data is output at the terminal 110 in the video hold state then the user 108 does not think that the video call has dropped and does not perceive a lack of continuity in the video call.

Advantageously, as described above the use of the video hold state allows the user 102 to engage in the video call while performing some action without that action being captured by the camera 228 and output to the user 108 in the video call.

The method steps described above and shown in FIG. 3 may be performed by modules at the terminals 104 and 110 either in software (e.g. by the clients 106 and 112) or in hardware. For example, a transmitting module may be implemented at the terminal 104 (e.g. using client 106) for transmitting data, such as the video data captured by the camera 228 and the video hold message described above, to the terminal 110 in the video call. As another example, a receiving module may be implemented at the terminal 110 (e.g. using client 112) for receiving data, such as the video data captured by the camera 228 and the video hold message described above, from the terminal 104 in the video call. As another example, a determining module may be implemented at the terminal 104 (e.g. using client 106) and/or at the terminal 110 (e.g. using client 112) for determining the holding video data as described above.

The clients 106 and 112 described above may be provided as computer program products embodied on non-transient computer-readable media and may be configured to be executed on the CPUs of the terminals 104 and 110 for performing the methods described herein.

In the embodiments described above, it is the user 102 who initiates the video hold state. However, in other embodiments it may be the user 108 who initiates an equivalent video hold state using the terminal 108 such that holding video data is output at the display 204 of the terminal 104 instead of outputting video data captured at the terminal 110 in real-time. This can be implemented in the same way that the user 102 can initiate the video hold state as described above.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of performing a video call between a first terminal and a second terminal, the method comprising:
   capturing video data, for the video call, with a camera of the first terminal;
   transmitting the captured video data in real-time to the second terminal for use in the video call sufficient to cause output of the captured video data in real-time at a display of the second terminal in the video call;
   receiving a video hold input from a user at the first terminal to initiate a video hold state at the first terminal and effective to cause holding video data to be output at the display of the second terminal in the video hold state instead of outputting video data captured by said camera of the first terminal in real-time; and
   during the video hold state, capturing at least some video data with the camera of the first terminal and, during the video hold state, transmitting to the second terminal the at least some video data captured with the camera of the first terminal during the video hold state.

2. The method of claim 1 wherein said determining holding video data is performed responsive to receiving said video hold input at the first terminal.

3. The method of claim 1 further comprising transmitting a video hold message to the second terminal responsive to receiving said video hold input at the first terminal, said video hold message indicating that the video hold state has been initiated.

4. The method of claim 1 wherein said determining holding video data is performed at the first terminal and the method further comprises transmitting the determined holding video data to the second terminal.

5. The method of claim 1 wherein said holding video data is a single image.

6. The method of claim 1 wherein said holding video data comprises a single image which is overlaid with moving images which are caused to be output at the display of the second terminal by the video hold state.

7. The method of claim 1 wherein said holding video data comprises a plurality of frames of the video data captured by the camera of the first terminal, and wherein said plurality of frames are caused to be output at the display of the second terminal by the video hold state.

8. The method of claim 1 further comprising, in the video hold state, outputting at the first terminal an indication that the video has been placed on hold at the display of the second terminal.

9. The method of claim 1 further comprising receiving a video unhold input from the user at the first terminal to end the video hold state and thereby causing to resume outputting the captured video data in real-time at the display of the second terminal in the video call.

10. A system comprising a first terminal and a second terminal, wherein the system is configured to perform a video call between the first and second terminals, wherein the first terminal comprises:
    a camera configured to capture video data for the video call;
    a user interface configured to receive a video hold input from a user to initiate a video hold state; and a transmitting module configured to transmit the captured video data in real-time to the second terminal for use in the video call sufficient to cause display of the captured video data in real-time in the video call and in the video hold state, to cause holding video data to be displayed at the second terminal instead of video data captured by said camera of the first terminal in real-time, and in the video hold state to transmit to the second terminal at least some video data captured with the camera of the first terminal during the video hold state.

11. A method of engaging in a video call between a first terminal and a second terminal, the method comprising:
    capturing video data, for the video call, with a camera of the first terminal;
    transmitting the captured video data to the second terminal for output in real-time at a display of the second terminal in the video call;
    receiving a video hold input from a user at the first terminal to initiate a video hold state; and
    transmitting data to the second terminal responsive to receiving said video hold input at the first terminal, said transmitted data being such that, in the video hold state, holding video data, instead of video data captured by said camera of the first terminal in real-time, is caused to be output at the display of the second terminal by transmission of the transmitted data so as to make display of the holding video data, instead of video data captured by said camera of the first terminal in real-time, unknown to a user of the second terminal, the holding video data comprising at least one image with a changed background caused by a change in lighting of the holding video data.

12. The method of claim 11 wherein said transmitted data is a video hold message indicating to the second terminal that the video hold state has been initiated.

13. The method of claim 11 further comprising determining said holding video data at the first terminal, wherein said transmitted data comprises the determined holding video data.

14. The method of claim 11 further comprising, in the video hold state, stopping at least one of: (i) the transmission of the captured video data in real-time to the second terminal, and (ii) the capturing of video data with the camera of the first terminal.

15. The method of claim 11 wherein said holding video data is based on video data captured with the camera of the first terminal prior to the initiation of the video hold state.

16. The method of claim 11 wherein said holding video data is a single image.

17. The method of claim 11 wherein said holding video data comprises a single image which is overlaid with moving images which are caused to be output at the display of the second terminal by the video hold state.

18. The method of claim 17 wherein a portion of said single image includes an image of the user and wherein the method further comprises determining said moving images based on feature recognition applied to said image of the user.

19. The method of claim 18 wherein said moving images represent movements to the head or eyes of the user in said image of the user.

20. The method of claim 16 wherein the single image is either: (i) a frame of the video data captured by the camera of the first terminal, or (ii) representative of at least part of an image captured by the camera when the video hold state is initiated.

21. The method of claim 11 wherein said holding video data comprises a plurality of frames of the video data captured by the camera of the first terminal, and wherein said plurality of frames are caused to be output at the display of the second terminal by the video hold state.

22. The method of claim 21 wherein said plurality of frames are the last frames of video data captured by the camera before the video hold state is initiated.

23. The method of claim 11 further comprising receiving a video unhold input from the user at the first terminal to end the video hold state.

24. A terminal configured to engage in a video call with a further terminal, the terminal comprising:
    a camera configured to capture video data for the video call;
    a transmitting module configured to transmit the captured video data to the further terminal for output in real-time at a display of the further terminal in the video call; and
    a user interface configured to receive a video hold input from a user to initiate a video hold state,
    wherein the transmitting module is further configured to transmit data to the further terminal responsive to receiving said video hold input at the user interface, said transmitted data being such that, in the video hold state, holding video data, instead of video data captured by said camera of the terminal in real-time, is caused to be output at the display of the further terminal by transmission of the transmitted data so as to make display of the holding video data, instead of video data captured by said camera of the terminal in real-time, unknown to a user of the further terminal, the holding video data comprising at least one image with a changed background caused by a change in lighting of the holding video data.

25. The terminal of claim 24 further comprising a determining module configured to determine said holding video data, wherein said transmitted data comprises the determined holding video data.

26. A computer program product for engaging in a video call between a first terminal and a second terminal, the computer program product being embodied on a computer-readable medium and configured so as when executed on a processor of the first terminal to perform operations comprising:
    capturing video data for the video call;
    transmitting the captured video data to the second terminal for output in real-time at a display of the second terminal in the video call;
    receiving a video hold input from a user at the first terminal to initiate a video hold state; and
    transmitting data to the second terminal responsive to receiving said video hold input, said transmitted data being such that, in the video hold state, holding video data, instead of video data captured by said camera of the first terminal in real-time, is caused to be output at the display of the second terminal by transmission of the transmitted data so as to make display of the holding video data, instead of video data captured by said camera of the first terminal in real-time, unknown to a user of the second terminal, the holding video data comprising at least one image with a changed background caused by a change in lighting of the holding video data.

27. A method of engaging in a video call between a first terminal and a second terminal, the method comprising:
    receiving, at the second terminal, video data captured at the first terminal in real-time for use in the video call;
    outputting the captured video data in real-time at a display of the second terminal in the video call;
    receiving, at the second terminal, a video hold message indicating that a video hold state has been initiated;

determining holding video data for output at the display of the second terminal in the video hold state, said determined holding video data comprising at least in part inserted errors simulating network problems; and in the video hold state, outputting, at the display of the second terminal, said determined holding video data instead of outputting video data captured at the first terminal in real-time, the outputting of said determined holding data being on a loop.

28. The method of claim 27 wherein said determining holding video data is performed at the second terminal responsive to receiving said video hold message at the second terminal.

29. The method of claim 27 wherein said holding video data is based on video data captured at the first terminal prior to the initiation of the video hold state.

30. The method of claim 27 wherein said holding video data is a single image.

31. The method of claim 27 wherein said holding video data comprises a single image which is overlaid with moving images which are output at the display of the second terminal in the video hold state.

32. The method of claim 31 wherein a portion of said single image includes an image of the user and wherein the method further comprises determining said moving images based on feature recognition applied to said image of the user.

33. The method of claim 32 wherein said moving images represent movements to the head or eyes of the user in said image of the user.

34. The method of claim 30 wherein the single image is either: (i) a frame of the video data captured at the first terminal, or (ii) representative of at least part of an image captured at the first terminal before the video hold state is initiated.

35. The method of claim 27 wherein said holding video data comprises a plurality of frames of the video data captured at the first terminal, and wherein said plurality of frames are output at the display of the second terminal in the video hold state.

36. The method of claim 35 wherein said plurality of frames are the last frames of video data captured at the first terminal before the video hold state is initiated.

37. The method of claim 27 further comprising, in the video hold state, outputting an indication that the video has been placed on hold at the display of the second terminal.

38. A terminal configured to engage in a video call with another terminal, the terminal comprising:

a receiving module configured to receive video data captured at said another terminal in real-time for use in the video call, and further configured to receive a video hold message indicating that a video hold state has been initiated;

a display configured to output the captured video data in real-time in the video call; and a determining module configured to determine holding video data for output at the display in the video hold state, said determined holding video data comprising at least in part inserted errors simulating network problems, wherein the terminal is configured to output, in the video hold state, at the display of the terminal, said determined holding video data instead of outputting video data captured at the another terminal in real-time, the outputting of said determined holding data being on a loop.

39. A computer program product for engaging in a video call between a first terminal and a second terminal, the computer program product being embodied on a computer-readable medium and configured so as when executed on a processor of the second terminal to perform operations comprising:

receiving video data captured at the first terminal in real-time for use in the video call;

outputting the captured video data in real-time at a display of the second terminal in the video call;

receiving a video hold message indicating that a video hold state has been initiated;

determining holding video data for output at the display of the second terminal in the video hold state, said determined holding video data comprising at least in part inserted errors simulating network problems; and in the video hold state, outputting, at the display of the second terminal, said determined holding video data instead of outputting video data captured at the first terminal in real-time, the outputting of said determined holding data being on a loop.

* * * * *